United States Patent [19]
Voss et al.

[11] Patent Number: 5,668,324
[45] Date of Patent: Sep. 16, 1997

[54] STRAIN SENSORS HAVING ULTRA-HIGH DYNAMIC RANGE

[76] Inventors: Karl Friedrich Voss, 12716 87th Ct. NE., Kirkland, Wash. 98034; Keith H. Wanser, 26202 Escala Dr., Mission Viejo, Calif. 92691

[21] Appl. No.: 625,204

[22] Filed: Apr. 1, 1996

[51] Int. Cl.[6] ................................. G02B 6/02; H01J 5/16
[52] U.S. Cl. ................................. 73/800; 73/826
[58] Field of Search .............................. 73/800, 760, 796, 73/818, 826, 831

[56] References Cited

U.S. PATENT DOCUMENTS

| | | | |
|---|---|---|---|
| 4,734,577 | 3/1988 | Szuchy | 73/800 |
| 4,982,611 | 1/1991 | Lorenz et al. | 73/862.043 |
| 5,126,558 | 6/1992 | Rogers, Jr. et al. | 73/800 |
| 5,188,983 | 2/1993 | Guckel et al. | 73/862.59 |
| 5,461,927 | 10/1995 | Bobb et al. | 73/800 |

*Primary Examiner*—Richard Chilcot
*Assistant Examiner*—Max H. Noori
*Attorney, Agent, or Firm*—Leonard Tachner

[57] ABSTRACT

A sensor configuration increases the usefulness of Fiber Optic Displacement Sensors by mounting them on an elastomer substrate. The sensor configuration can also be used for most other sensors. The elastomer substrate is used to pre-mount the sensors, making field installation easier, increasing the range of the sensors, allowing strain sensors to measure compression and elongation, and providing a mechanism whereby the sensors can be protected from failure due to excess strain. The sensing range of the sensor is increased by employing an elastomer substrate to which only a portion provides mounting for the fiber, thereby significantly enhancing the dynamic range of the sensor.

15 Claims, 4 Drawing Sheets

STRAIN SENSORS HAVING ULTRA-HIGH DYNAMIC RANGE

BACKGROUND OF THE INVENTION

1. Field of the Invention

This invention relates generally to the field of strain sensors and more specifically to strain sensors which have greatly enhanced dynamic range.

2. Prior Art

Strain sensors are currently used in numerous applications. Recently, fiber optic strain sensors have become known. Such sensors offer several advantages over conventional strain sensors. These include, but are not limited to, electromagnetic immunity, high resolution and relative ease of interrogation. However, such sensors suffer from the disadvantage of being limited to strains on the order of 1%, after which they usually fail in a fatal fashion, (i.e., they are destroyed).

SUMMARY OF THE INVENTION

Fiber Optic Displacement Sensors of the present invention, in addition to having all the advantages of conventional fiber optic sensors, are also able to survive strains of up to at least 25%. They also have very low Young's moduli, and do not affect the measurement of small strains on soft materials due to loading effects.

However, fiber optic displacement sensors critically depend on mounting conditions, making field work difficult in some conditions. The present invention utilizes a mounting technique that:

1) allows the sensors to be pre-mounted in the lab under controlled conditions;

2) increases the range of the sensors;

3) allows them to measure both expansion and compression; and 4) provides a mechanism to protect the sensor from failure in case of excessive strain.

Part of the technique presented can also apply to conventional sensors and other optical fiber sensors.

When an elastomer is subjected to extension, the strain is distributed uniformly throughout the elastomer (provided the elastomer is uniform). If a sensor is mounted on an elastomer substrate so that it will only sense displacement of a part of the substrate, the overall sensing range of the combination of sensor and elastomer is correspondingly increased, while the combined resolution suffers an equivalent reduction.

Conventional strain sensors can only measure extensions. If a sensor on an elastomer substrate is mounted on the surface to be monitored so that it is under tension, the sensor will be able to measure both expansion and compression of the surface.

If the yield strength of the elastomer substrate is less than the yield strength of the sensor when fully extended, the elastomer will take up all additional extension, preventing the sensor from failing.

Furthermore, pre-mounting the sensor on an elastomer substrate reduces the amount of mounting that needs to be done in the field and correspondingly increases reproducibility and consistency of these sensors.

OBJECTS OF THE INVENTION

It is therefore a principal object of the present invention to provide a strain sensor having a very high dynamic range of strain measurement.

It is also an object of the invention to provide strain sensors which can be used to measure compression as well as extension.

It is another object of the invention to provide strain sensors which can be protected against strain-induced failure at even large displacements.

It is still another object of the invention to provide a fiber optic displacement strain sensor which can measure displacements up to at least twenty-five percent of nominal.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
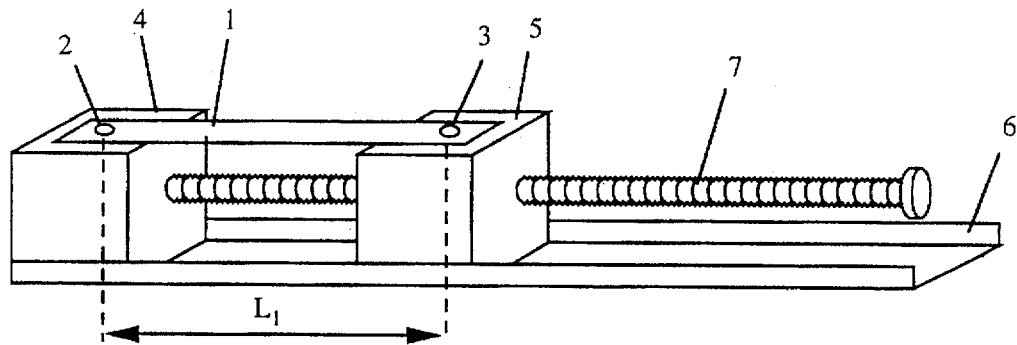
FIG. 1 is a three-dimensional view of a first step in the process of preparing the elastomer substrate of the invention.

With reference to FIGS. 1, 2, 3 and 4, there is shown an elastic substrate 1, secured using suitable means such as screws, bolts, cement or other means, at locations 2 and 3 to a stationary block 4 and a mobile block 5, respectively. Block 5 can move with respect to the stationary block 4 in only one dimension, being restricted in its motion in all other dimensions by tray 6. The initial distance $L_1$ between sensor attachment points 2 and 3 is the length of the elastomer substrate under zero tension. The distance between the attachment points 2 and 3 can be changed and fixed using the positioning screw 7 (FIG. 1).

Although the size of the sensors can be scaled, a typical dimension is $L_1=4$ cm when the elastomer is not stretched.

Figure 2:
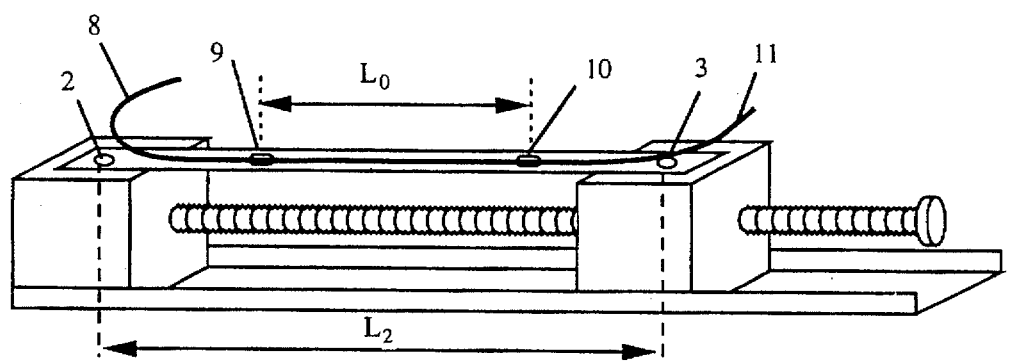
FIG. 2 is a three-dimensional view of a second step in the process of preparing the fiber/substrate interface of the invention.
Figure 3:
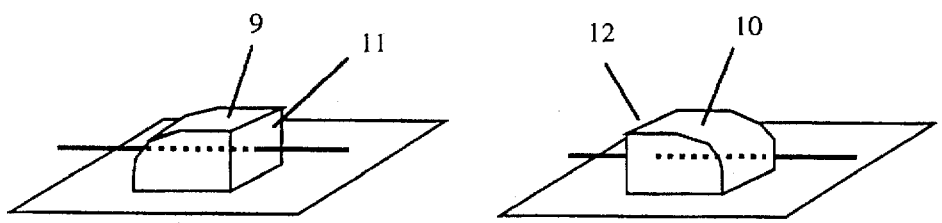
FIG. 3 is an enlarged three-dimensional view of the fiber attachment points of the invention.
Figure 4:
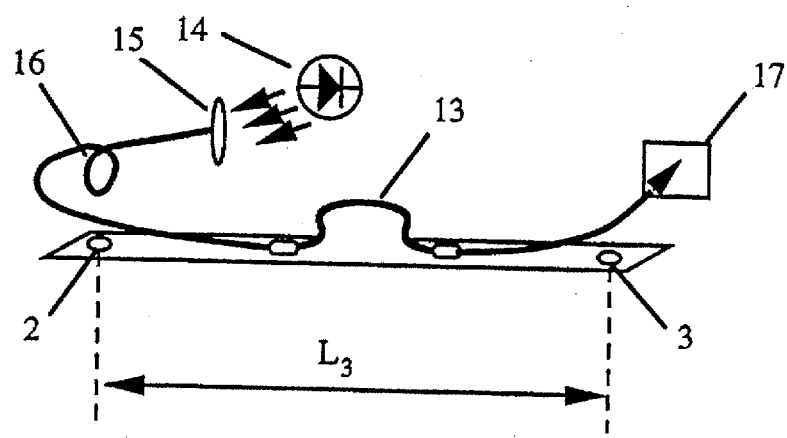
FIG. 4 is a schematic block diagram of a sensor configured in accordance with a preferred embodiment of the invention.

This distance between locations 2 and 3 is increased using screw 7 from $L_1$ to $L_2$, where $L_2>L_1$ (FIG. 2). A typical number would be $L_2=6$ cm. An optical fiber 8 (either single mode fiber SMF or multi-mode fiber MMF) is then laid down flat upon the substrate 1 and secured using adhesive or other suitable means to the substrate at locations 9 and 10. These attachment points are picked to have a distance $L_o$ of preferably 5 mm$<L_o<$2 cm. It is important that fiber 8 exit the face 11 of attachment 9 (and the corresponding face 12 of attachment 10) as parallel as possible to the substrate 1, and that face 11 (12) be as perpendicular as possible to the fiber 8 as is indicated in FIG. 3, so that the fiber is not restricted in any way in its movement between points 9 and 10. These conditions can be approximated well enough using adhesive of sufficient viscosity and setting speed. It is also possible to cover the region between points 9 and 10 prior to cementing with some substance (later to be removed) which will inhibit any adhesive from leaking into this free region and thus ensure the satisfaction of these conditions.

Figure 6:
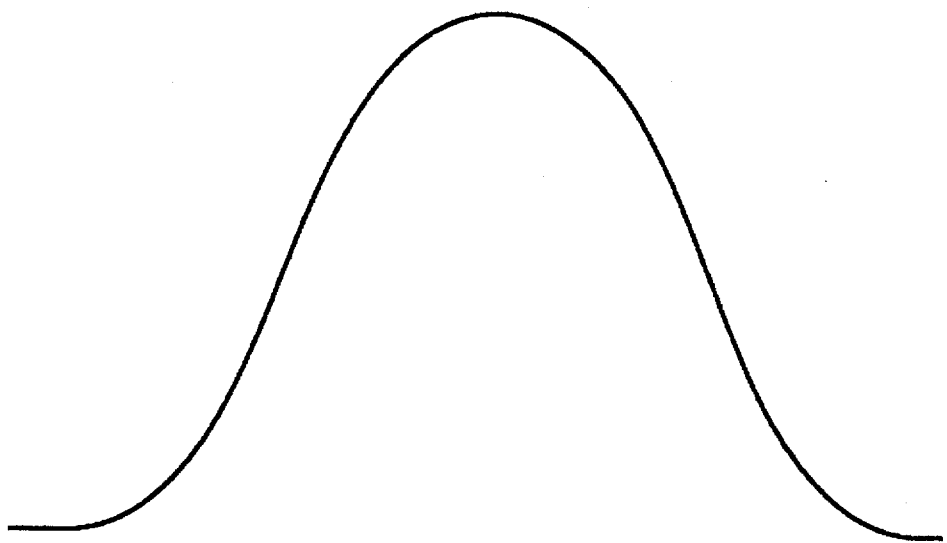
FIG. 6 is an illustration of the fiber configuration of a fiber optic displacement sensor.

After the sensor has been thus built, the distance between the points 2 and 3 is reduced back to $L_1$, so that the portion of fiber 8 which is located between points 9 and 10 will assume a characteristic shape 13. (See FIGS. 4 and 6). The elastomer substrate with the sensor on it can now be dismounted from blocks 4 and 5 and later secured to the object under investigation (FIG. 4) at points 2 and 3.

Light is injected into the fiber 8 using an available light source 14 (LED, laser, incandescent bulb) and necessary optics 15. Cladding modes are removed in modestripper 16 and the output of the sensor is directed onto photo detector 17. The sensor will change its transmission characteristics as a function of the shape that the fiber assumes. The shape is related to the distance $L_3$ between the attachment points 2 and 3. The output of the sensor onto the photo detector 17 thus varies as a function of the length $L_3$. Typical results are presented in FIG. 8.

Figure 5:
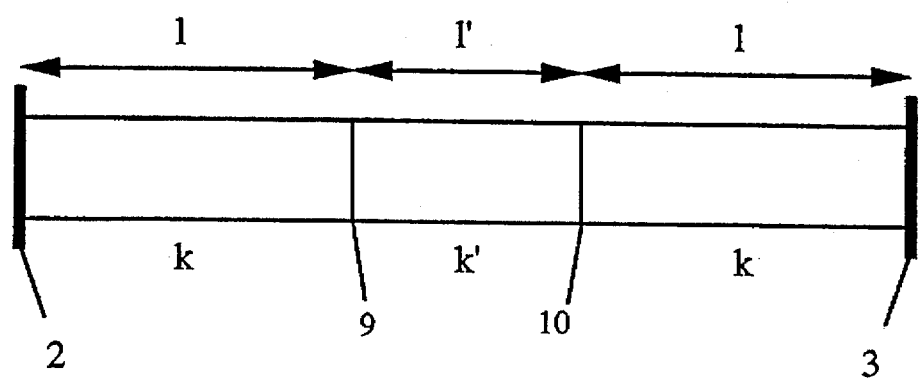
FIG. 5 is a schematic representation of the elastomer-sensor combination of the invention.

A simple model of the elastomer-sensor combination of the invention is presented in FIG. 5. The sensor is modeled as consisting of three parts. For simplicities sake it is assumed that the two outer sections are identical, although this need not be the case. The three sections have Young's moduli Y, Y' and Y, and lengths l, l' and l, respectively. The sensor is mounted in the center section of the elastomer.

The expansion $\Delta l'$ of the center section (the distance between points 9 and 10) is related to the expansion $\Delta L_3$ of the whole system (the distance between points 2 and 3) via $$\Delta l' = \frac{Y'\Delta L_3}{(2Y'l + Yl')}$$

By changing the relative lengths and Youngs moduli, we can control the relative expansion $\Delta l'$ of the center section in relation to the expansion $\Delta L_3$ of the entire combination, making the displacement the sensor (mounted between points 9 and 10) experiences any desired fraction of the extension to which the substated is subjected.

Conventional strain gages have relatively high Young's moduli, so corresponding elastic substrates need to be specifically chosen. The disclosed fiber optic displacement sensors actually have small spring constants in the sensing region, placing only minimal restrictions on the choice of substrate. Choosing a matched substrate will reduce the effective spring constant of the center section to 0, which eliminates any error introduced in strain measurement of materials with very low Young's moduli. Specifically, the spring constant of the sensor undergoes a non-continuous change from a small number (in sensing range) to a large number corresponding to the spring constant of the fiber (in the fully extended shape). If the elastomer is chosen so that its spring constant is in between these two numbers it will:

(a) act as the mechanical de-sensitizing agent described above while the sensor is in the sensing range; and (b) protect the sensor if it is extended beyond its fully extended shape by taking up all the extra expansion.

Fiber Optic Displacement sensors operate on the principle of curvature loss in bent fibers. The sensors take advantage of the specific shape the sensor assumes upon changing the distance between the two attachment points. Reproducibility is assured by requiring that the boundary conditions of the sensor are well defined. This also allows mathematical modeling of the shape that the fiber assumes. We have found that the largest contributions to the change in both transmission and reflection originate in the regions of smallest bend radii and fastest change of bend radii (at locations A, C and E in FIG. 6).

Figure 8:
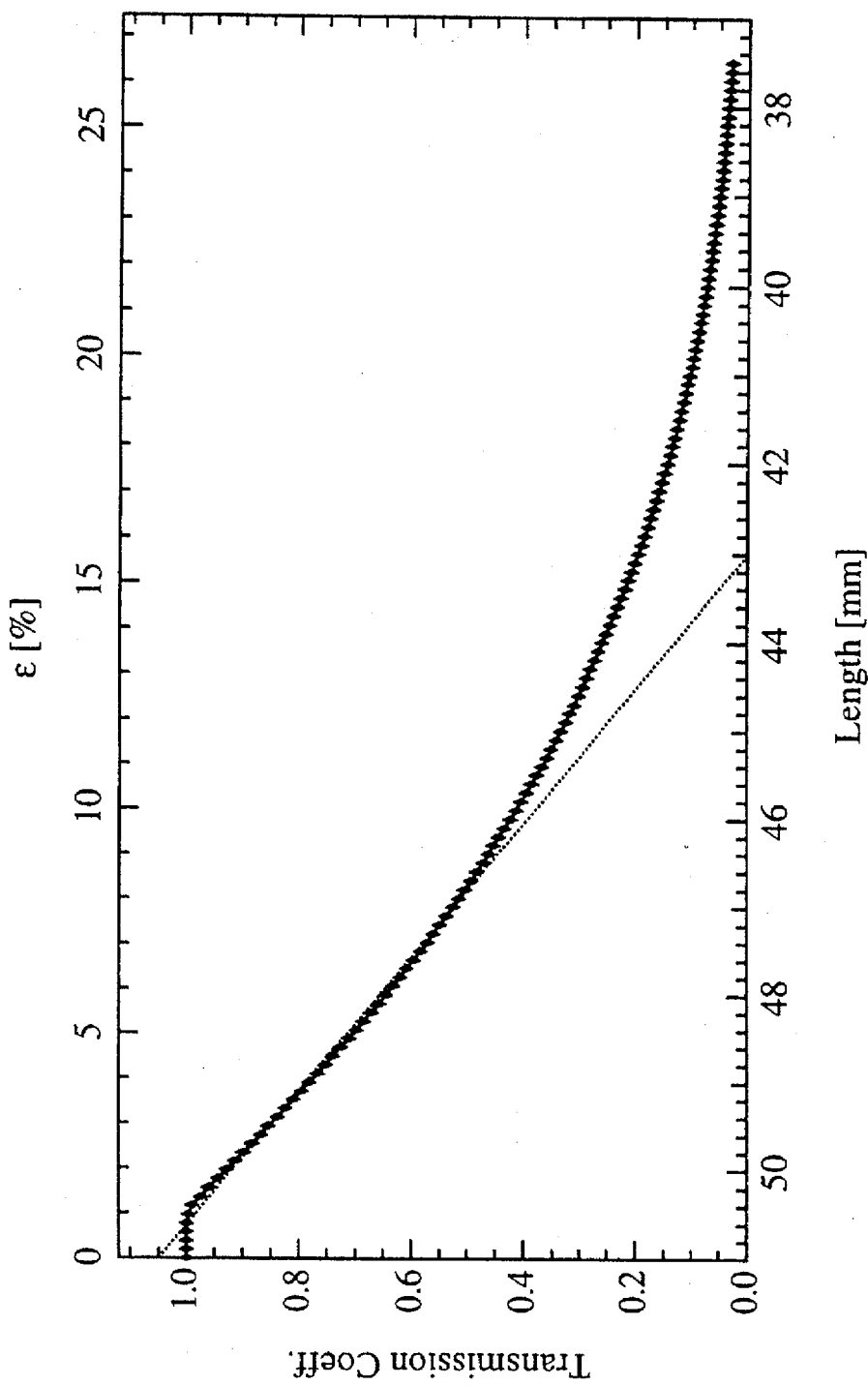
FIG. 8 is a graphical illustration of data taken using the sensor configuration shown in FIG. 4.

In FIG. 8, we present the results of a measurement using the embodiment described above. The elastomer employed was a rubber band. The specific dimensions used were $L_1$=35 mm and $L_2$=51 mm (so that the substrate was stretched by 16 mm). Onto this stretched substrate, a sensor of length $L_o$=10 mm made out of 50–125 polyacrylate buffered multi-mode fiber (MMF) was mounted using a cyanoacrylate adhesive. The sensor was illuminated using a light emitting diode (LED) having a wavelength centered at 840 nm. The modestripper employed was 1 km of 50–125 MMF. Data were collected using a photodetector interfaced to a computer that simultaneously monitored the distance $L_3$.

FIG. 8 presents the normalized transmission coefficient as a function of the distance between the two outer points (2 and 3) (bottom axis). The corresponding strain $\epsilon$ (top axis) was calculated as:

$$\epsilon = \frac{\Delta L_3}{L_2}$$

As can be seen, the sensor can withstand strains in excess of 25%, which is considerably larger than standard strain gages of the prior art. The response is nearly linear (indicated by the straight line with a slope of −0.132/mm) between 1 and 10% strain and becomes less sensitive for higher strains. The residual non-linearity can easily be removed with suitable electronics or software.

FIG. 8 indicates that one can mount the sensor pre-stressed, so that a response can be measured in both the compression and the expansion directions. For sensors with $L_1$=3.5 cm, $L_2$=5.1 cm and $L_o$=1 cm, one can assure maximal responsiveness in both directions for an equilibrium distance of about 4.5 cm. The sensor then reproducibly measures changes of distances of more than ±5 mm.

Figure 7:
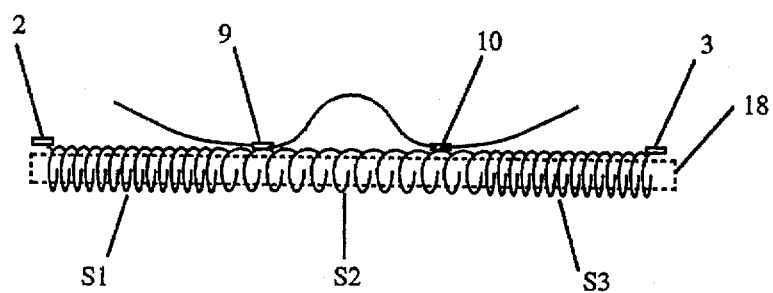
FIG. 7 is an illustration of an alternative embodiment of the invention employing a different form of substrate.

An alternative embodiment of the present invention is presented in FIG. 7, where the sensor is mounted on a spring with a non-continuous distribution of spring constants. In order to prevent the spring from sagging, a guide rod 18 has been inserted into the spring. The spring can be tuned to any specific response desired, and could conceivably even have a chirped spring constant, (i.e., a spring constant which ramps up or down along the length of the spring).

Those having skill in the relevant arts will now perceive various modifications and additions which may be made to the invention. By way of example, various other sensors and substrates may be employed other than those shown herein as exemplary of preferred embodiments. Accordingly, all such modifications and additions are deemed to be within the scope of the invention which is limited only by the claims appended hereto and their equivalents.

We claim:

1. A strain sensor for measuring the strain between at least two points on an object; the sensor comprising:

a sensor device exhibiting at least one measuring characteristic responsive to the distance between two spaced points to which the sensor device is attached;

an elongated elastomeric substrate extendable in a selected direction between a relaxed condition and an extended condition;

said sensor device being affixed to said elastomeric substrate at two spaced attachment points for measuring the distance between said two attachment points irrespective of the extension of said substrate between said points on said object.

2. The strain sensor recited in claim 1 wherein said sensor device comprises a fiber optic displacement sensor.

3. The strain sensor recited in claim 1 wherein said sensor device is configured for measuring both increases and decreases in the distance between said attachment points.

4. The strain sensor recited in claim 1 wherein said attachment points correspond to the maximum measurable strain of said strain sensor when said substrate is in said extended condition.

5. The strain sensor recited in claim 1 wherein said measurable characteristic is the relative magnitude of light transmission through an optical fiber.

6. The strain sensor recited in claim 1 wherein said sensor device comprises a length of optical fiber arcuately configured between said attachment points for bending to an extent inversely proportional to the elongation of said substrate.

7. The strain sensor recited in claim 6 further comprising means for measuring light transmission loss through said optical fiber for determining strain along a surface underlying and in contact with said substrate.

8. A sensor for measuring strain between two points on an object; the sensor comprising:

a distance measuring transducer; and a stretchable substrate;

the transducer being connected to said substrate at a plurality of attachment points for measuring the distance between said attachment points irrespective of the stretch length of the substrate between said two points on said object.

9. The strain sensor recited in claim 8 wherein said transducer comprises a fiber optic displacement sensor.

10. The strain sensor recited in claim 8 wherein said transducer is configured for measuring both increases and decreases in the distance between said attachment points.

11. The strain sensor recited in claim 8 wherein said attachment points correspond to the maximum measurable distance of said transducer when said substrate is in an extended condition.

12. The strain sensor recited in claim 9 wherein said displacement sensor responds to the relative magnitude of light transmission through an optical fiber.

13. The strain sensor recited in claim 8 wherein said transducer comprises a length of optical fiber arcuately configured between said attachment points for bending to an extent inversely proportional to the elongation of said substrate.

14. The strain sensor recited in claim 13 further comprising means for measuring light transmission loss through said optical fiber for measuring strain along a surface of said objects underlying and in contact with said substrate.

15. The strain sensor recited in claim 11 wherein said transducer is configured relative to said substrate to remain intact when said substrate is extended beyond said extended condition.

* * * * *